United States Patent
Lee et al.

(10) Patent No.: US 12,204,046 B2
(45) Date of Patent: Jan. 21, 2025

(54) RADAR CONTROL DEVICE AND METHOD

(71) Applicant: HL KLEMOVE CORP., Incheon (KR)

(72) Inventors: Jingu Lee, Gyeonggi-do (KR); Jung Hwan Choi, Seoul (KR)

(73) Assignee: HL KLEMOVE CORP., Incheon (KR)

( * ) Notice: Subject to any disclaimer, the term of this patent is extended or adjusted under 35 U.S.C. 154(b) by 383 days.

(21) Appl. No.: 17/942,134

(22) Filed: Sep. 10, 2022

(65) Prior Publication Data
US 2023/0124566 A1   Apr. 20, 2023

(30) Foreign Application Priority Data
Oct. 18, 2021   (KR) .................. 10-2021-0138474

(51) Int. Cl.
*G01S 7/40*   (2006.01)
*G01S 7/35*   (2006.01)
*G01S 13/931*   (2020.01)

(52) U.S. Cl.
CPC ............ *G01S 7/40* (2013.01); *G01S 7/356* (2021.05); *G01S 13/931* (2013.01)

(58) Field of Classification Search
CPC ...... G01S 7/356; G01S 13/931; G01S 13/343; G01S 13/42; G01S 13/584; G01S 7/4091
See application file for complete search history.

(56) References Cited

U.S. PATENT DOCUMENTS

| | | | |
|---|---|---|---|
| 9,983,294 B2* | 5/2018 | Oshima | G01S 13/58 |
| 2003/0085835 A1* | 5/2003 | Matsui | G01S 13/931 |
| | | | 342/72 |
| 2021/0333386 A1* | 10/2021 | Park | G01S 7/356 |

FOREIGN PATENT DOCUMENTS

JP    2000149197 A  *  5/2000  ............ G08G 1/167

OTHER PUBLICATIONS

JP2000149197A—Vehicle circumference monitoring device—Google Patents.pdf—JP2000149197A translation (Year: 2000).*

* cited by examiner

*Primary Examiner* — Olumide Ajibade Akonai
*Assistant Examiner* — Yonghong Li
(74) *Attorney, Agent, or Firm* — WOMBLE BOND DICKINSON (US) LLP

(57) ABSTRACT

The embodiments relate to a radar control device and method. Specifically, a radar control device according to the embodiments may include a transceiver configured to transmit a transmission signal to the surroundings of a host vehicle and receive a reception signal received by reflecting the transmission signal on an object, a determiner configured to generate a first range-Doppler map by performing fast Fourier transform (FFT) on the reception signal and generate a second range-Doppler map based on a comparison group including a plurality of preset temporary lateral distances, and determine a correlation coefficient between the first range-Doppler map and the second range-Doppler map, and an estimator configured to estimate a lateral distance between the host vehicle and the object based on the correlation coefficient.

14 Claims, 8 Drawing Sheets

RADAR CONTROL DEVICE AND METHOD

CROSS REFERENCE TO RELATED APPLICATION

This application claims priority from Korean Patent Application No. 10-2021-0138474, filed on Oct. 18, 2021, which is hereby incorporated by reference for all purposes as if fully set forth herein.

TECHNICAL FIELD

The embodiments of the present disclosure relate to a radar control device and method.

Recently, the number of vehicles equipped with radar is increasing. An electronic control unit of the vehicle may calculate the distance, relative speed, and angle between the host vehicle and an object around the host vehicle based on the information output from the radar mounted on the vehicle.

The vehicle equipped with a radar may provide various safety functions or convenience functions by using the distance, relative speed, and angle between the host vehicle and an object around the host vehicle.

The information about the object is required to be generated to estimate the distance to the object, so that it is required a more accurate and faster method of estimating the distance to the object.

SUMMARY

In this background, embodiments of the present disclosure provide a radar control device and method capable of estimating a lateral distance between a host vehicle and an object by setting a specific lateral distance group.

In an aspect of the present disclosure, there is provided a radar control device including a transceiver configured to transmit a transmission signal to the surroundings of a host vehicle and receive a reception signal received by reflecting the transmission signal on an object, a determiner configured to generate a first range-Doppler map by performing fast Fourier transform (FFT) on the reception signal and generate a second range-Doppler map based on a comparison group including a plurality of preset temporary lateral distances, and determine a correlation coefficient between the first range-Doppler map and the second range-Doppler map, and an estimator configured to estimate a lateral distance between the host vehicle and the object based on the correlation coefficient.

In another aspect of the present disclosure, there is provided a radar control method including transmitting a transmission signal to the surroundings of a host vehicle and receiving a reception signal received by reflecting the transmission signal on an object, generating a first range-Doppler map by performing fast Fourier transform (FFT) on the reception signal and generating a second range-Doppler map based on a comparison group including a plurality of preset temporary lateral distances, and determining a correlation coefficient between the first range-Doppler map and the second range-Doppler map, and estimating a lateral distance between the host vehicle and the object based on the correlation coefficient.

According to embodiments of the radar control device and method according to the present disclosure, it is possible to accurately estimate the distance to the object by identifying an object having an inaccurate speed detected by the radar sensor, thereby improving the performance of the radar sensor.

DETAILED DESCRIPTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, it will be described a radar control device according to an embodiment of the present disclosure with reference to the accompanying drawings.

Figure 1:
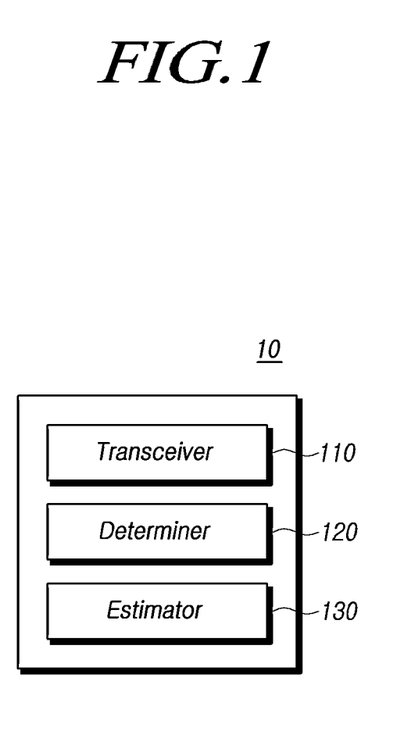
FIG. 1 is a block diagram illustrating a radar control device according to an embodiment of the present disclosure.

FIG. 1 is a block diagram illustrating a radar control device 10 according to an embodiment of the present disclosure.

A radar control device 10 according to an embodiment of the present disclosure may include a transceiver 110, a determiner 120 and an estimator 130.

The radar control device 10 according to an embodiment of the present disclosure may be an advanced driver assistance systems (ADAS) which is mounted on a host vehicle 20 and provides information to assist the driving of the host vehicle 20 or provides assistance to the driver in controlling the host vehicle 20.

Here, ADAS may refer to various types of advanced driver assistance systems, and examples of the driver assistance systems may include, for example, an autonomous emergency braking (AEB), a smart parking assistance system (SPAS), a blind spot detection (BSD) system, an adaptive cruise control (ACC) system, a lane departure warning system (LDWS), a lane keeping assistance System (LKAS), a lane change assistance system (LCAS), and the like. However, the present disclosure is not limited thereto.

Here, the host vehicle may refer to a vehicle capable of moving on the ground without using a railroad or a built-in line by mounting a prime mover and rolling wheels with the power. The host vehicle may be an electric vehicle which is powered by electricity, and obtains driving energy by rotating a motor with electricity accumulated in a battery rather than obtaining driving energy from combustion of fossil fuels.

The radar control device 10 may be applied to a manned vehicle controlled by a driver of the host vehicle or an autonomous vehicle that automatically travels without driver intervention.

The transceiver 110 may transmit a transmission signal to the vicinity of the host vehicle 20 and receive a reception signal in which the transmission signal is reflected by an object.

The radar control device 10 may include an antenna unit.

The antenna unit may include one or more transmission antennas and one or more receiving antennas, and each transmission/receiving antenna may be an array antenna in which one or more radiating elements are connected in series by a feed line, but is not limited thereto.

The antenna unit may include a plurality of transmission antennas and a plurality of receiving antennas, and may have various types of antenna array structures according to an arrangement order and an arrangement interval thereof.

The transceiver 110 may provide a function of transmitting a transmission signal through a switched transmission antenna by switching to one of a plurality of transmission antennas included in the antenna unit or transmitting a transmission signal through a multi-transmission channel allocated to the plurality of transmission antennas.

The transceiver 110 may include an oscillator for generating a transmission signal for one transmission channel allocated to the switched transmission antenna or multi-transmission channels allocated to a plurality of transmission antennas. The oscillator may include, for example, a voltage-controlled oscillator (VCO) and an oscillator.

The transceiver 110 may receive a reception signal received by being reflected from an object through a receiving antenna.

In addition, the transceiver 110 may provide a function of receiving a reception signal, which is a reflection signal of the transmission signal reflected by a target, through the switched receiving antenna by switching to one of a plurality of receiving antennas, or a function of receiving a reception signal through multi-receiving channels allocated to a plurality of receiving antennas.

The transceiver 110 may include a low-noise amplifier (LNA) for low-noise amplification of a reception signal received through one receiving channel allocated to the switched receiving antenna or received through a multi-receiving channel allocated to a plurality of receiving antennas, a mixer for mixing the low-noise amplified reception signal, an amplifier for amplifying the mixed reception signal, and a converter (e.g., an analog digital converter) for digitally converting the amplified reception signal to generate reception data.

The determiner 120 may generate a first range-Doppler map by performing fast Fourier transform (FFT) on the reception signal and generate a second range-Doppler map based on a comparison group including a plurality of preset temporary lateral distances. In addition, determiner 120 may determine a correlation coefficient between the first range-Doppler map and the second range-Doppler map.

Figure 2:
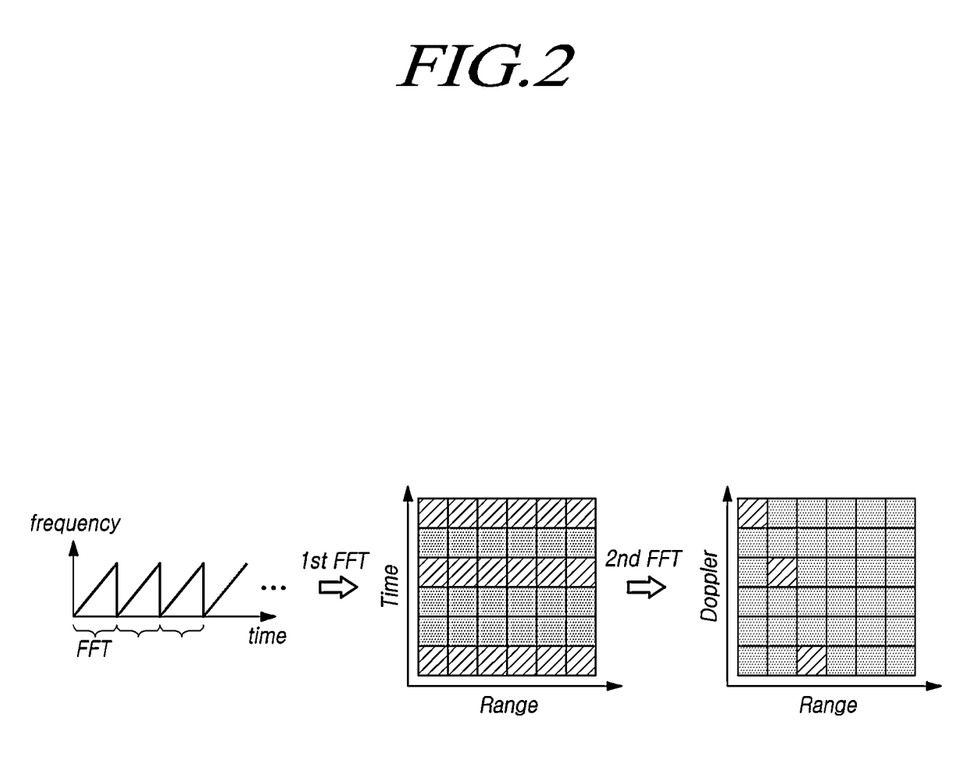
FIG. 2 illustrates generation of a range-Doppler map by performing a fast Fourier transform (FFT) on a reception signal according to an embodiment.

FIG. 2 illustrates generation of a range-Doppler map by performing a fast Fourier transform (FFT) on a reception signal according to an embodiment.

Referring to FIG. 2, the transceiver 110 may transmit and receive a fast-chirp signal to the vicinity of the host vehicle 20. In addition, the radar control device 10 may utilize a fast chirp radar sensor to generate a range-Doppler map by receiving the fast-chirp signal.

The determiner 120 may perform a first FFT (Fast Fourier Transform) on the reception signal to extract a range and a time component, and perform a second FFT with respect to time again to compress a signal existing at each distance according to a velocity (or speed) component value to classify the signal component. In addition, the determiner 120 may generate a detected peak map for the 2D spectrum of the range-Doppler by determining whether or not peak power exists for each coordinate in the range-Doppler domain. Specifically, the determiner 120 may generate a range-Doppler binary map in which it is determined that the peak power exists (e.g., consisting of p=1). Accordingly, the determiner 120 may generate a first Range-Doppler map based on the reception signal.

Therefore, if the host vehicle 20 is driven while the radar sensor is mounted, the mounted radar sensor can obtain a signal of a vehicle existing around the host vehicle 20 and a signal for a stationary object around the road. In addition, signal components for a stationary object may have relative speed components similar to each other. Examples of stationary objects may include guard rails, steel tunnels, sound barriers, and the like. Such a stationary object may have a long shape along the shape of the road due to its characteristics, and may appear as a similar speed value in the entire distance section of the range-Doppler map.

In general, in the case of estimating the lateral distance through a radar sensor, there may be performed through a corner radar sensor. The corner radar sensor may receive a signal by the side structure (e.g., clutter) with strong intensity.

Among the side structures or the clutters, the angle of incidence received by the radar sensor may vary according to the longitudinal distance of a stationary object such as a guard rail due to its characteristics. That is, the relative speed of the signal may vary according to the distance of the stationary object.

In addition, in the case that the reception signal is orthogonal to the traveling direction of the host vehicle 20 (that is, angle with respect to the object+the mounting angle of the radar sensor), since the relative speed Vk of the corresponding signal is calculated as 0 m/s, as shown in Equation 1 below, it may be difficult to accurately estimate the relative speed of the object.

$$v_k = -v_{ego} * \cos(\theta_k + \varphi) \quad \text{[Equation 1]}$$

Accordingly, when estimating the lateral distance between the object and the host vehicle 20 in a general method, there may be occurred a ghost due to an incorrect relative speed. To prevent this, there takes time until a sufficient number of objects are created.

In Equation 1 described above, the speed $V_{ego}$ of the host vehicle 20 may be obtained by detecting the wheel speed of the host vehicle 20 from a speed sensor mounted on the host vehicle 20.

In an embodiment of the present disclosure, it is possible to recognize a structure or estimate a lateral distance to a structure based on a peak estimation result in a range-Doppler map, rather than a general object-based structure recognition method.

Figure 3:
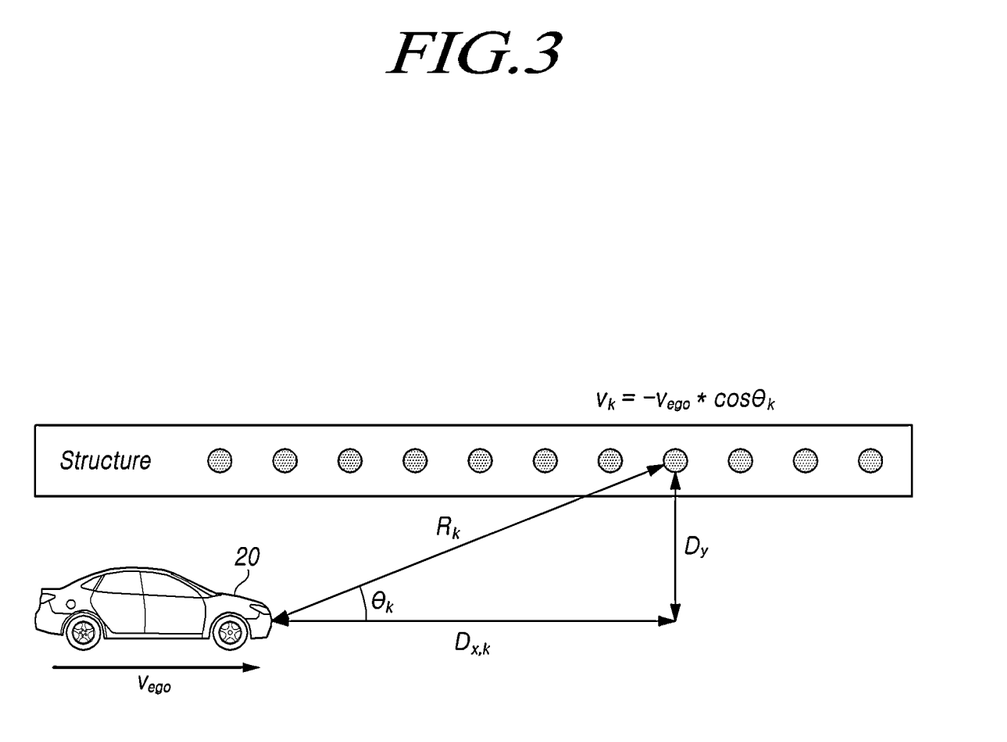
FIG. 3 is a diagram for explaining generating a second range-Doppler map according to an embodiment.
Figure 4A:
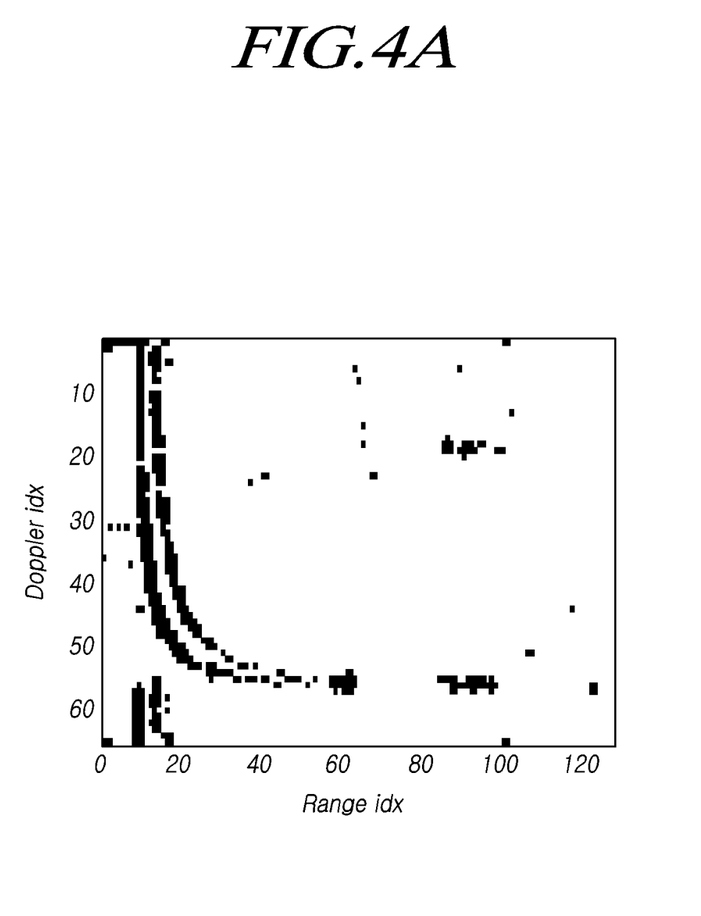
FIGS. 4A and 4B are diagrams for explaining a first range-Doppler map and a second range-Doppler map according to an embodiment.
Figure 4B:
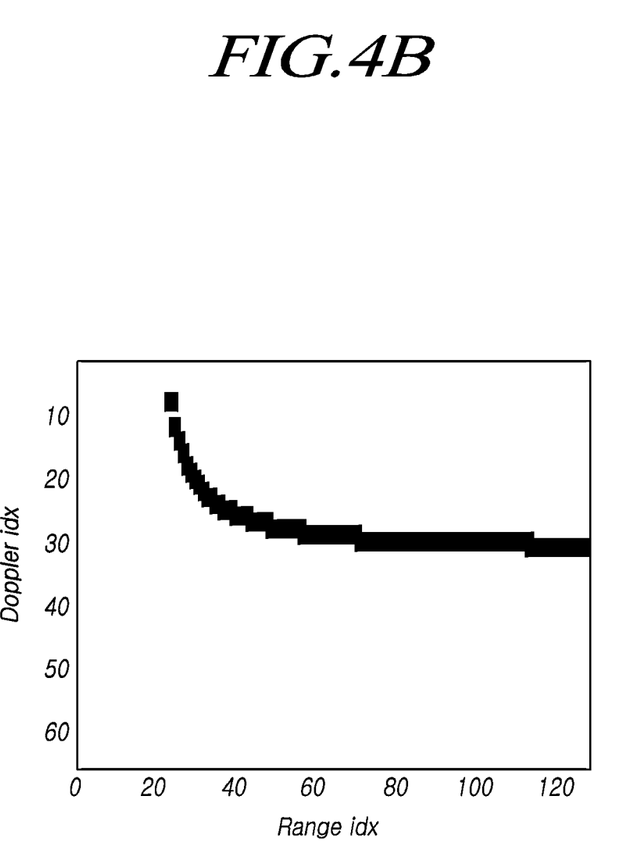

FIG. 3 is a diagram for explaining generating a second range-Doppler map according to an embodiment, and FIGS. 4A and 4B are diagrams for explaining a first range-Doppler map and a second range-Doppler map according to an embodiment.

Referring to FIG. 3, the determiner 120 may generate a second range-Doppler map by using Equations 2 and 3 below based on a comparison group set to have a predetermined temporary lateral distance.

Specifically, a comparison group having a plurality of predetermined temporary lateral distances according to an embodiment may be expressed as Equation 2 below.

$$D_y^{(n)} \in \{0.5m, 0.6m, \ldots, 10.0m\}, n=\{0,1,\ldots,96\} \quad \text{[Equation 2]}$$

In addition, the relative speed Vk is calculated by applying each lateral distance value to Equation 1 above, and Equations 3 and 4 below may be used therefor.

$$D_{x,k}^{(n)} = \sqrt{(R_k^{(n)})^2 - (D_y^{(n)})^2} \quad \text{[Equation 3]}$$

$$\theta_k^{(n)} = \tan^{-1} \frac{D_y^{(n)}}{D_{x,k}^{(n)}} \quad \text{[Equation 4]}$$

Here, Dx,k is the longitudinal distance between the host vehicle 20 and the object, Dy is the lateral distance between the host vehicle 20 and the object, Rk is the linear distance between the host vehicle 20 and the object, θk is an angle between the traveling direction of the host vehicle 20 and Rk.

The determiner 120 may determine a relative speed corresponding to each lateral distance included in the comparison group, and may generate the second range-Doppler map based on values (lateral distance, relative speed) for which the peak power value corresponding to the corresponding range-Doppler point exists. That is, there may be generated as a range-Doppler binary map in which peak power values are represented by 0 and 1.

The second range-Doppler map generated as described above may be expressed as Equation 5 below.

$$MAP_{(n)}(r,d) \quad \text{[Equation 5]}$$

$$r=\{0,\ldots,R-1\}, =\{0,\ldots,D-1\}$$

Here, R is the number of range bins or range binaries, and D is the number of Doppler bins or Doppler binaries.

The determiner 120 may generate a first range-Doppler map by applying a peak power map to a 2D spectrum in the range-Doppler domain determined by performing FFT on the reception signal.

The determiner 120 may determine a correlation coefficient between the first range-Doppler map and the second range-Doppler map. The correlation coefficient may be calculated using Equation 6 below.

$$\gamma_{(n)} = \sum_{v=0}^{D-1} \sum_{r=0}^{R-1} S(r,d) \cdot MAP_{(n)}(r,d) \quad \text{[Equation 6]}$$

The estimator 130 may estimate the lateral distance between the host vehicle 20 and the object based on the determined correlation coefficient.

Referring to 4A and 4B, FIG. 4A is a first radar-Doppler map generated based on a reception signal, and FIG. 4B is a second radar Doppler map generated based on a temporary lateral distance included in the comparison group.

The estimator 130 may determine correlation coefficient, and may determine a temporary lateral distance with high similarity by comparing the first radar-Doppler map and the second Range-Doppler map corresponding to the temporary lateral distance, respectively. That is, the higher the similarity between the first range-Doppler map and the second range-Doppler map, the higher the correlation coefficient between the first range-Doppler map and the second range-Doppler map may be calculated.

Figure 5:
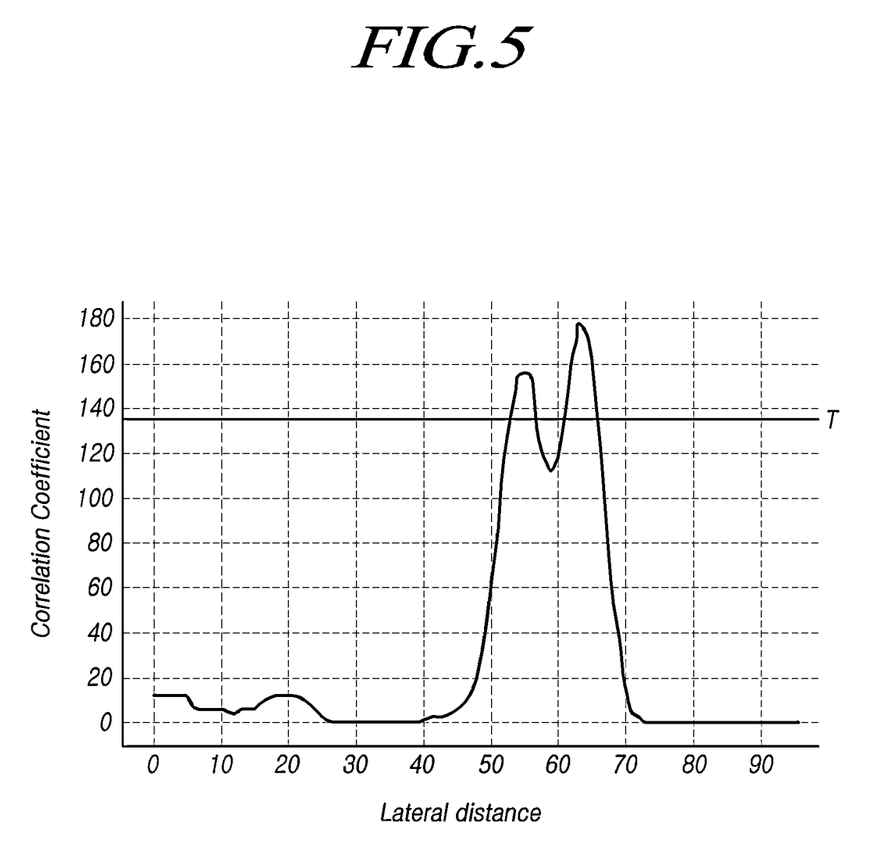
FIGS. 5 and 6 are diagrams for explaining estimating a lateral distance between a host vehicle and an object based on a determined correlation coefficient according to an embodiment.
Figure 6:
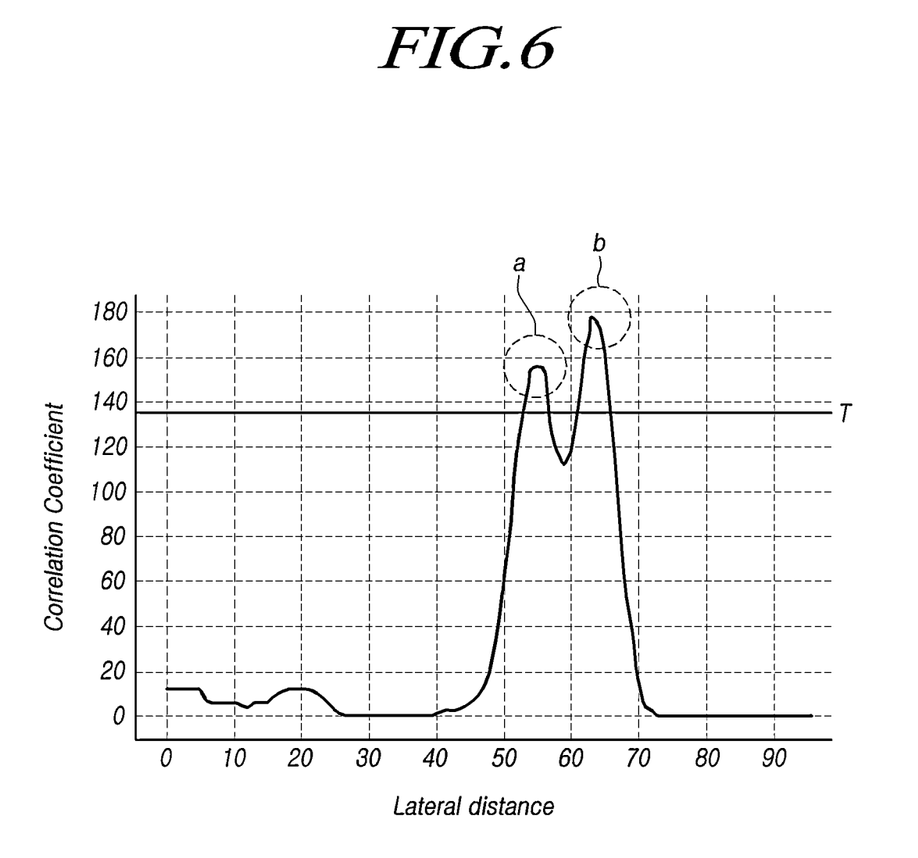

FIGS. 5 and 6 are diagrams for explaining estimating a lateral distance between a host vehicle 20 and an object based on a determined correlation coefficient according to an embodiment.

Referring to FIG. 5, if the correlation coefficient exceeds a predetermined value, the estimator 130 may estimate the temporary lateral distance corresponding to the determined correlation coefficient as the lateral distance between the host vehicle 20 and the object.

The maximum value of the above-described correlation coefficient may be expressed by Equation 7 below.

$$n_{max} = \arg\max \gamma_{(n)} \quad \text{[Equation 7]}$$

$$\gamma_{n_{max}} > T$$

In the case that the correlation coefficient exceeds a predetermined value, the estimator 130 may determine that the host vehicle 20 is in a section passing a long structure, and store a temporary lateral distance value $D_y^{(n_{max})}$ corresponding to the correlation coefficient.

If the determined correlation coefficient exceeds T, the estimator 130 may estimate the temporary lateral distance corresponding to the correlation coefficient as the lateral distance between the host vehicle 20 and the object. In addition, the estimator 130 may estimate that a long structure exists around a road through which the host vehicle 20 passes.

Referring to FIG. 6, peaks 'a' and 'b' in a graph of FIG. 6 are the peaks calculated to exceed a predetermined value T. In this case, the estimator 130 may determine that the double wall surface exists in a mounting direction of the radar sensor on the host vehicle 20 or that the wall surface exists on the left and right sides of the host vehicle 20. If it is determined that there is a double wall surface, the estimator 130 may estimate the close distance as the lateral distance, and if it is determined that the wall surface exists on the left and right sides, the estimator 130 may refer to the opposite radar sensor information to integrally determine.

If a plurality of correlation coefficients exceeding a predetermined value are determined, the estimator 130 may estimate a temporary lateral distance corresponding to the correlation coefficient with the highest value as the lateral distance between the host vehicle 20 and the object. That is, the estimator 130 may estimate the temporary lateral distance having the second range-Doppler map most similar to the first range-Doppler map as the lateral distance between the host vehicle 20 and the object.

If a plurality of correlation coefficients exceeding a predetermined value are determined, the estimator 130 may estimate a lateral distance corresponding to the correlation coefficient closest to the average value of the correlation coefficients as the lateral distance value between the host vehicle 20 and the object.

Here, a plurality of temporary lateral distances may be set at the same interval from the lane in which the host vehicle 20 is traveling.

In addition, the estimator 130 may reset the interval between the temporary lateral distances according to the result of the correlation coefficient determined between the first range-Doppler map and the second range-Doppler map.

For example, if the determined correlation coefficient is less than or equal to a predetermined value, the interval between the temporary lateral distances may be set to be narrower. The fact that the correlation coefficient of each of the second range-Doppler generated based on the temporary lateral distances included in the comparison group is determined to be less than or equal to a predetermined value means that the similarity with the first range-Doppler map is low. Therefore, there may be determined that the interval between the temporary lateral distances is too wide, or may be determined that an object exists outside a set range. Therefore, the estimator 130 may increase the number of temporary lateral distances within the same range by setting the interval between the temporary lateral distances narrowly, or may increase the set range while maintaining the interval between the temporary lateral distances to increase the number of temporary lateral distances.

In addition, the estimator 130 may estimate the lateral distance in consideration of a mounting offset of the radar sensor mounted on the host vehicle 20. This can be expressed as Equation 8 below.

$$\widehat{D_y} = D_y^{(n_{max})} + D_{offset}$$ [Equation 8]

As described above, the radar control device 10 of the present disclosure may determine the correlation between the second range-Doppler map generated from the temporary lateral distance and the first range-Doppler map generated from the radar measurement value. Accordingly, it is possible to more accurately estimate the lateral distance between the host vehicle 20 and the object by excluding the object having an inaccurate speed.

The radar control device 10 may be implemented as an electronic control unit (ECU), a microcomputer, or the like. For example, an electronic control unit (not shown) of the radar control device 10 may include at least one or more elements of one or more processors, memories, storage unit, user interface input unit and user interface output unit, which may communicate with each other via a bus. Furthermore, the electronic control unit may also comprise a network interface for connecting to the network. The processor may be a CPU or a semiconductor device that executes processing instructions stored in memory and/or storage unit. Memory and storage unit may include various types of volatile/non-volatile storage media. For example, memory may include ROM and RAM.

Hereinafter, it will be described a radar control method using the radar control device 10 capable of performing all of the above-described present disclosure.

Figure 7:
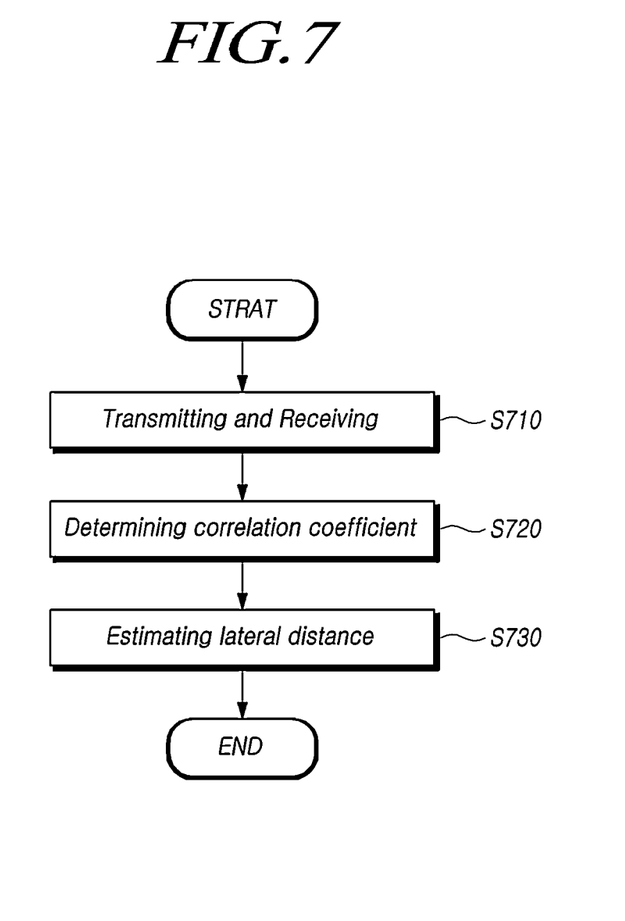
FIG. 7 is a flowchart illustrating a radar control method according to an embodiment of the present disclosure.

FIG. 7 is a flowchart illustrating a radar control method according to an embodiment of the present disclosure.

Referring to FIG. 7, the radar control method according to an embodiment of the present disclosure may include a transmitting/receiving step S710 of transmitting a transmission signal to the surroundings of a host vehicle 20 and receiving a reception signal received by reflecting the transmission signal on an object, a correlation coefficient determination step S720 of generating a first range-Doppler map by performing fast Fourier transform (FFT) on the reception signal and generating a second range-Doppler map based on a comparison group including a plurality of preset temporary lateral distances, and determining a correlation coefficient between the first range-Doppler map and the second range-Doppler map, and a lateral distance estimation step S730 of estimating a lateral distance between the host vehicle 20 and the object based on the correlation coefficient.

Here, a plurality of temporary lateral distances may be set at the same interval from the lane in which the host vehicle 20 is traveling.

For example, in the correlation coefficient determination step S720, if the correlation coefficient is less than or equal to the predetermined value, the interval between the plurality of temporary lateral distances may be set narrower. In this case, the setting range of the temporary lateral distance is the same, and the number of temporary lateral distances may increase.

As another example, in the correlation coefficient determination step S720, if the correlation coefficient is less than or equal to the predetermined value, a range in which the temporary lateral distance is set may be set wider. Here, the range in which the temporary lateral distance is set may mean an interval between the closest temporary lateral distance and the furthest temporary lateral distance from the host vehicle 20 in the left and right directions. Accordingly, in this case, as the range is set to be wider, the range may increase, and the number of temporary lateral distances included in the range may be set to be the same.

In the lateral distance estimation step S730, if the correlation coefficient exceeds a predetermined value, a temporary lateral distance corresponding to the correlation coefficient may be estimated as the lateral distance between the host vehicle 20 and the object.

In the lateral distance estimation step S730, if there are a plurality of correlation coefficients exceeding a predetermined value, a temporary lateral distance corresponding to a correlation coefficient with the highest value may be estimated as the lateral distance between the host vehicle 20 and the object.

In the lateral distance estimation step S730, if there are a plurality of correlation coefficients exceeding a predetermined value, a temporary lateral distance close to the host vehicle 20 among temporary lateral distances corresponding to the plurality of correlation coefficients may be estimated as the lateral distance between the host vehicle 20 and the object.

The second range-Doppler map applied to the correlation coefficient determination may be generated with a value having a peak power. Specifically, a range-Doppler bin (binary) map may be generated by applying a 2D spectrum from which peak power is calculated in the range-Doppler domain coordinates.

As described above, according to the radar control device and method of the present disclosure, it is possible to estimate the driving environment of the host vehicle by estimating the lateral distance of the object by setting a temporary lateral distance except for the speed estimated in a specific direction.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A radar control device comprising:
  a transceiver configured to transmit a transmission signal to the surroundings of a host vehicle and receive a reception signal received by reflecting the transmission signal on an object;
  a determiner configured to generate a first range-Doppler map by performing fast Fourier transform (FFT) on the reception signal and generate a second range-Doppler map based on a comparison group including a plurality of preset temporary lateral distances, and determine a correlation coefficient between the first range-Doppler map and the second range-Doppler map; and
  an estimator configured to estimate a lateral distance between the host vehicle and the object based on the correlation coefficient.

2. The radar control device of claim 1, wherein, if the correlation coefficient exceeds a predetermined value, the estimator estimates a temporary lateral distance corresponding to the correlation coefficient as the lateral distance between the host vehicle and the object.

3. The radar control device of claim 2, wherein the plurality of temporary lateral distances are set at the same interval from a lane in which the host vehicle is traveling.

4. The radar control device of claim 3, wherein, if the correlation coefficient is less than or equal to the predetermined value, the estimator sets an interval between the plurality of temporary lateral distances narrower.

5. The radar control device of claim 1, wherein, if there are a plurality of correlation coefficients exceeding a predetermined value, the estimator estimates a temporary lateral distance corresponding to a correlation coefficient with the highest value as the lateral distance between the host vehicle and the object.

6. The radar control device of claim 1, wherein, if there are a plurality of correlation coefficients exceeding a predetermined value, the estimator estimates a temporary lateral distance closest to the host vehicle among temporary lateral distances corresponding to the plurality of correlation coefficients as the lateral distance between the host vehicle and the object.

7. The radar control device of claim 1, wherein the second range-Doppler map is generated with a value having a peak power.

8. A radar control method comprising:
  transmitting a transmission signal to the surroundings of a host vehicle and receiving a reception signal received by reflecting the transmission signal on an object;
  generating a first range-Doppler map by performing fast Fourier transform (FFT) on the reception signal and generating a second range-Doppler map based on a comparison group including a plurality of preset temporary lateral distances, and determining a correlation coefficient between the first range-Doppler map and the second range-Doppler map; and
  estimating a lateral distance between the host vehicle and the object based on the correlation coefficient.

9. The radar control method of claim 8, wherein estimating comprises, if the correlation coefficient exceeds a predetermined value, estimating a temporary lateral distance corresponding to the correlation coefficient as the lateral distance between the host vehicle and the object.

10. The radar control method of claim 9, wherein estimating comprises, if there are a plurality of correlation coefficients exceeding a predetermined value, estimating a temporary lateral distance corresponding to a correlation coefficient with the highest value as the lateral distance between the host vehicle and the object.

11. The radar control method of claim 9, wherein estimating comprises, if there are a plurality of correlation coefficients exceeding a predetermined value, estimating a temporary lateral distance closest to the host vehicle among temporary lateral distances corresponding to the plurality of correlation coefficients as the lateral distance between the host vehicle and the object.

12. The radar control method of claim 9, wherein the plurality of temporary lateral distances are set at the same interval from a lane in which the host vehicle is traveling.

13. The radar control method of claim 12, wherein determining comprises, if the correlation coefficient is less than or equal to the predetermined value, setting an interval between the plurality of temporary lateral distances narrower.

14. The radar control method of claim 9, wherein the second range-Doppler map is generated with a value having a peak power.

* * * * *